United States Patent [19]
Meyer

[11] Patent Number: 5,418,283
[45] Date of Patent: May 23, 1995

[54] COMPOSITIONS AND A METHOD OF IMPROVING THE TRANSFER EFFICIENCY OF SPRAYED PAINTS

[75] Inventor: Victor E. Meyer, Midland, Mich.

[73] Assignee: Omni Tech International Ltd., Midland, Mich.

[21] Appl. No.: 221,605

[22] Filed: Apr. 1, 1994

Related U.S. Application Data

[63] Continuation-in-part of Ser. No. 648,855, Jan. 31, 1991, abandoned.

[51] Int. Cl.$^6$ ............................................. C08L 33/04
[52] U.S. Cl. ..................................... 525/50; 525/123; 525/227; 524/523
[58] Field of Search ..................... 524/523, 560, 522; 525/288, 50, 222, 227, 123

[56] References Cited

U.S. PATENT DOCUMENTS 3,859,389  1/1975  Carty et al. ......................... 525/288

*Primary Examiner*—Jeffrey T. Smith
*Attorney, Agent, or Firm*—Robert L. McKellar

[57] ABSTRACT

This invention deals with novel compositions of matter and a novel method for improving the transfer efficiency of solvent-based paints that are sprayed onto surfaces, wherein current practice normally results in significant loss of paint to the environment rather than deposition on the surface. Such novel compositions are ultra-high molecular weight acrylate polymers solubilized in a solvent-based acrylate paint.

4 Claims, 6 Drawing Sheets

PLOT TO DETERMINE INTRINSIC VISCOSITY

COMPOSITIONS AND A METHOD OF IMPROVING THE TRANSFER EFFICIENCY OF SPRAYED PAINTS

This is a continuation-in-part of application Ser. No. 07/648,855 filed on Jan. 31, 1991, now abandoned.

BACKGROUND OF THE INVENTION

This invention deals with compositions and a novel method of improving the transfer efficiency of paints that are sprayed unto surfaces. A major problem faced by industrial coaters is the poor transfer efficiency experienced in painting substrates by spray techniques. This problem is simply the loss of coating material that is spray directed toward the substrate. Most commercial spray painting operations require large volumes of air to atomize the paint in order to convey the spray droplets towards the object to be painted, and to carry any droplets not deposited on the surface to a collection area.

The air that passes by the spraying operation entrains a fairly large portion of the spray droplets along with solvents and other materials contained in the paint.

Depending on the shape being coated and the specific spraying techniques being used, the losses of paint may be from 30 to 75 percent of the weight of the paint sprayed. In a representative "good" operation, typically 40 to 45 percent of the paint is lost, corresponding to a transfer efficiency of only 55 to 65 percent.

Obviously, if the transfer efficiency could be improved in any manner, there would be a large economic gain to the manufacturer; and equally important, a decrease in solvent waste potentially released to the environment. The applicant has undertaken a search of the prior art, and the invention as disclosed herein did not appear in any of the materials of the search, and therefore the inventor takes the position that the instant invention is new and novel and has never been disclosed as a composition and means to improve the transfer efficiency of sprayed acrylic-based coatings.

SUMMARY OF THE INVENTION

The present invention relates to the improvement of the transfer efficiency of coatings by the discovery that a novel composition created by blending a transfer efficiency promoter, such as an ultra-high molecular weight acrylic polymer, with the coating prior to spraying will reduce the losses of the coating when the coating is sprayed towards a substrate. In addition, the promoter can be added at such low concentrations that the characteristics of the coating are essentially unchanged, which means equipment and procedures currently used in the industry may be used to give optimum transfer efficiency as well as other benefits that were not available prior to this invention.

BRIEF DESCRIPTION OF THE DRAWINGS

Figure 3:
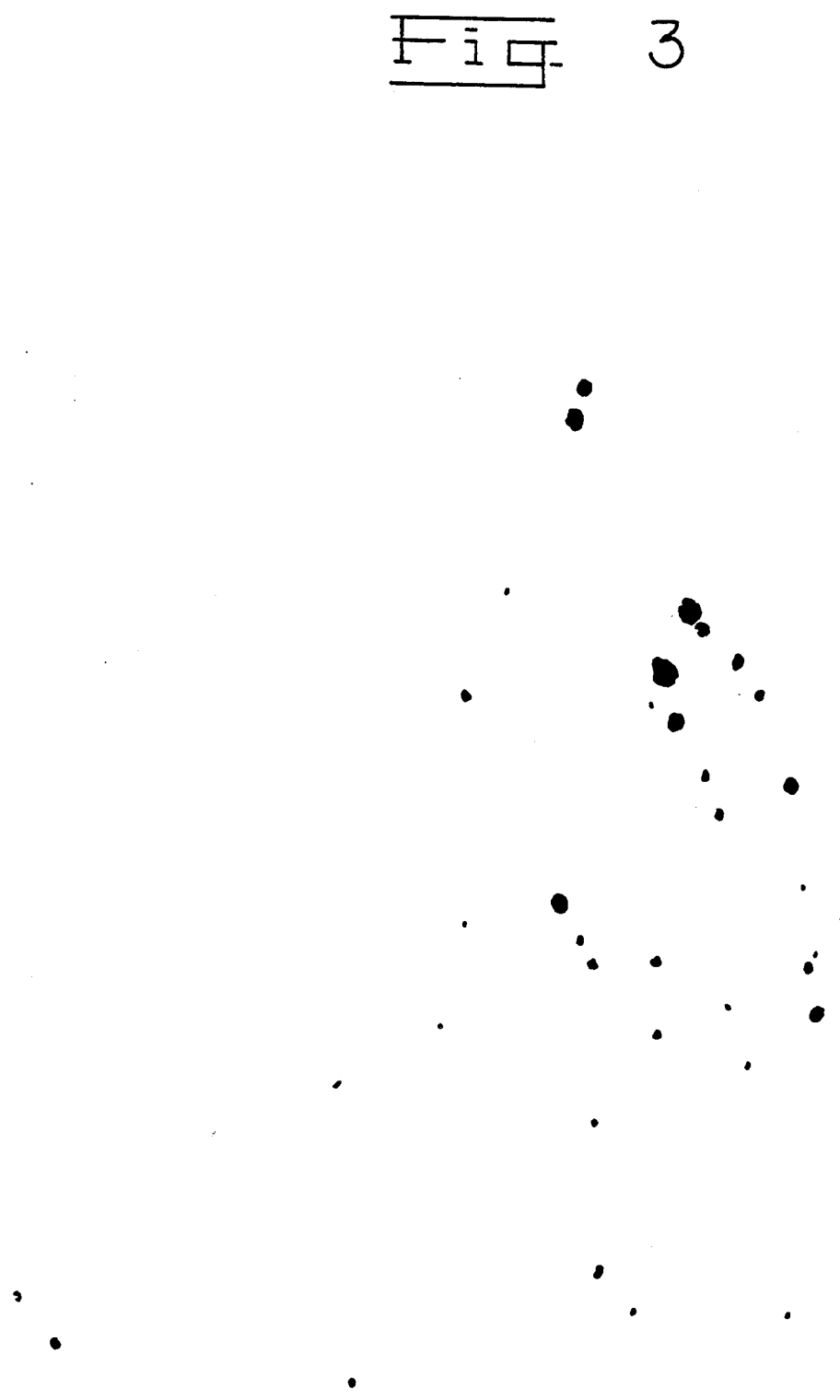

FIG. 3 is a splattergram from the evaluation device of FIG. 2 showing the results from a control sample which was a silver metallic paint with no additive in it.

Figure 4:
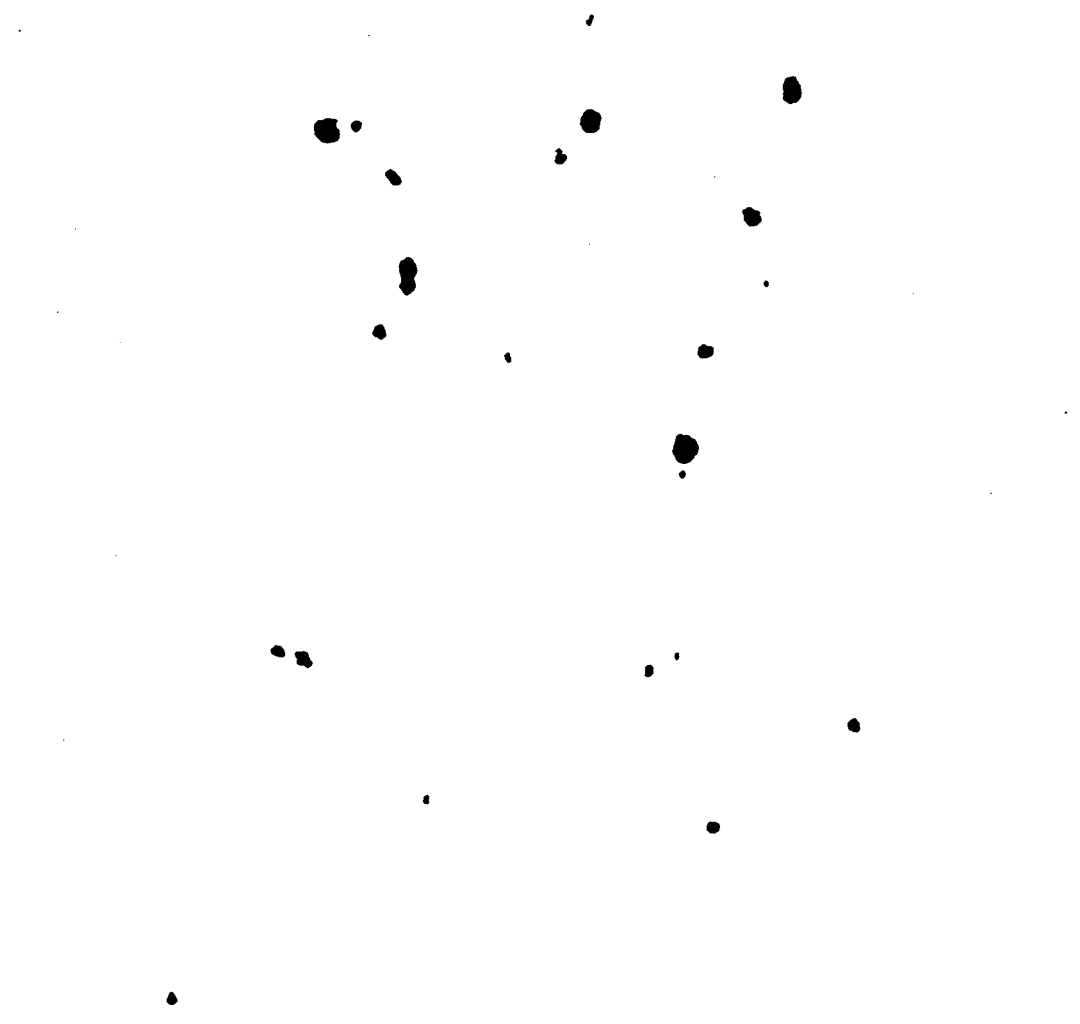

FIG. 4 is a splattergram from the evaluation device of FIG. 2 showing the results from silver metallic paint containing 150 ppm of polybutylmethacrylate according to the instant invention.

FIG. 6 is a splattergram from the evaluation device of FIG. 2 showing the results from silver metallic paint containing 600 ppm of polybutylmethacrylate according to the instant invention.

THE INVENTION

Figure 1:
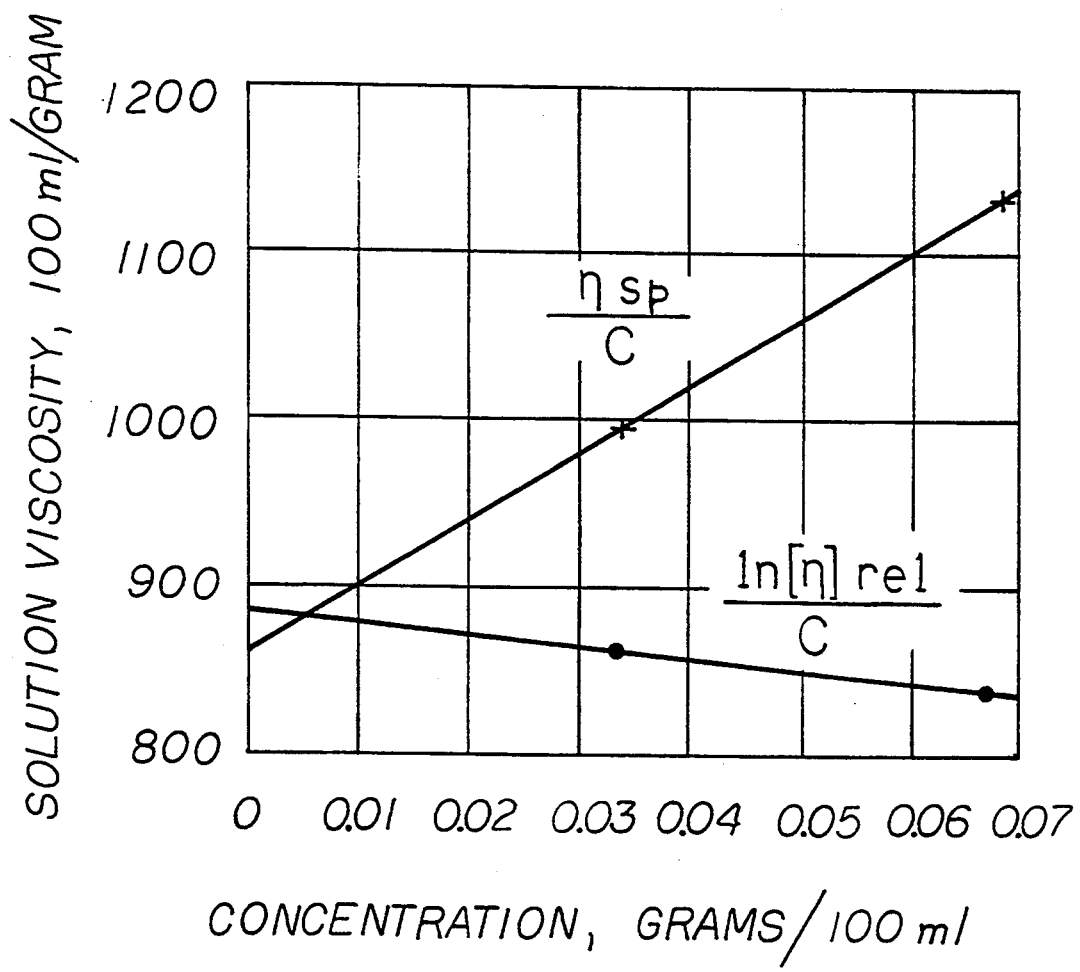
FIG. 1 is a plot used to determine intrinsic viscosity of the ultra-high molecular weight polymers of this invention.

This invention deals with a composition of matter which is created by blending ultra-high molecular weight polymers with paint vehicles and to the use of the ultra-high molecular weight polymers as additives to solvent-based coating materials to improve the transfer efficiencies of the coatings when they are used to coat various substrates, especially in commercial spray painting operations. Transfer efficiency as used in this specification and claims means the fraction by weight (normally expressed as a percentage) of the coating composition sprayed towards an object which is actually deposited on the object.

As indicated above, the normal transfer efficiencies for coating materials that are realized with solvent-based coatings in commercial coating operations are in the neighborhood of 55 to 60%. Thus, 40 to 45% by weight of the coating being sprayed towards the surface does not in fact attach to the surface, but is lost, creating both an economic and a disposal problem. It is believed by those in the industry that a 10 relative percent improvement transfer efficiency would be very meaningful in the industry. Therefore, the additives of the present invention are highly useful in the industry in view of the fact that they improve the transfer efficiency of sprayed coatings by a factor of at least "10 relative percent". Thus, improving the transfer efficiency say, from 60 to 66% in commercial spray coating operations, gives the additives of this invention a decided commercial advantage.

In order to be useful herein the additives should be readily soluble in the vehicle of the coating composition. By "vehicle" it is meant the solvent and binder used in the coating composition. The binder materials are organic polymers and the solvents typically consist of mixed aromatics, ketones, aliphatics, and alcoholic solvents. Therefore, the additive may need to contain, in some cases, a mixture of polar and non-polar characteristics. Contemplated as examples falling within the scope of this invention as binders are organic materials such as solvent-based epoxy, solvent-based acrylic/urethane, solvent-based alkyd resins, solvent-based alkyd primer/sealers, solvent-based urethanes, solvent-based acrylic enamels, and solvent-based, and, heat resistant silicone, resins, among others.

The additives should be compatible with the resinous binder in the coating formulation. For purposes of this invention, "compatible" means that the additive does not cause any agglomeration or other destabilization of the coating composition. It is essential that the additives achieve the transfer efficiencies desired by the industry while not detracting from the surface characteristics and the appearance of the finished coating, therefore, the additives should have little or no negative impact on the finished coated surface. The additives should have very little or no negative effect on the flow characteristics of the coating and finally, the additives should have little or no effect on the aging characteristics of the finished coated surfaces.

Thus, the invention described herein comprises the concept that certain defined acrylic materials, when added to organic polymeric coating formulations at very low concentrations, act as transfer efficiency promoters, significantly improving transfer efficiency of that coating when used in commercial spraying operations. This invention also comprises a method of improving the transfer efficiency of sprayed clear coatings, the method comprising blending with the clear coating prior to spraying, an ultra-high molecular weight polymer which is soluble in the vehicle of the clear coating. With reference to the additive compositions, it has been found that the additives can be used in the coatings in the concentrations of from about 10 to about 1000 ppm in order to be effective for the spray painting applications. It is believed by the inventor herein that the use of the additives of the instant invention allow for enlargement of the particle size of the coatings when sprayed and allows for enhanced particle size distribution as well.

Thus what has been described are ultra-high molecular weight polymeric additives that are useful for enhancing the transfer efficiency of sprayed paints and other coatings, novel compositions of matter comprising these additives and the paint vehicles in which they are soluble, as well as methods of enhancing the transfer efficiency of sprayed paints and other coatings.

Ultra-high molecular weight polymers of this invention were prepared using low temperature emulsion polymerization techniques. Prior art polymerization techniques permit production of polymers with molecular weights in the range of about 20,000 to about 1,000,000; whereas ultra-high molecular weight polymers useful in the practice of the present invention have molecular weights greater than about 4,000,000 and preferably in the range of 8,000,000 to 12,000,000. Obtaining molecular weights in this higher range generally requires special techniques and careful attention to cleanliness. Traces of impurities or foreign particles can upset the polymerization either by causing formation of large fractions of low molecular weight material or by destroying the catalyst and preventing any polymerization, or can result in incomplete polymerization.

Polymerization Technique

The polymerization processes of this invention were carried out in a three-necked, 500 ml round-bottomed glass flask equipped with a stirring apparatus, thermowell, nitrogen inlet, and a water-cooled reflux condenser. The flask was immersed in a standard stirred, thermostatically-controlled constant temperature bath to maintain uniformity of temperature. At the beginning of each experiment, dry nitrogen was bubbled through the polymerization mixture with the outlet of the nitrogen introduction tube being below the surface of the polymerizable liquid, with care being taken to avoid excessive froth, and in order to remove all traces of oxygen from the polymerizable liquid. Thereafter, the nitrogen was used to blanket the interior of the vessel. Care was taken to free the monomeric acrylates of any residual inhibitor. This was accomplished by first shaking approximately 300 ml of polymerizable monomer in a separatory flask with about 100 ml of 10% sodium hydroxide solution. After thoroughly shaking for about two minutes, followed by phase separation and removal of the caustic solution, the procedure was repeated with deionized water until the separated water was neutral to Ph paper. Although the polymerizations in these examples were typically run for three days at 30° C. to insure complete polymerization, the percent solids data indicate that the polymerizations were usually near or at completion within a twenty-four hour time period.

Occasionally, depending on the starting polymerizable monomer, the temperature would have to be raised slightly, such as up to about 50° C. The percent solids was gravimetrically determined in an aluminum pan using samples weighing about 10 grams which were first air-dried at ambient temperature overnight in a vented hood, followed by vacuum-drying for about seven hours at 75° C. From the final vacuum-dried polymer, dilute solutions (0.02 to 0.07 grams per 100 ml toluene) were prepared by shaking on a wrist shaker for not less than three days. These dilute solutions were used for determining molecular weight as described infra. Concentrated solutions (1.5 g/100 ml of toluene) were prepared for use in determining vehicle compatibility and for use as paint additives to evaluate in the test described below. The materials that were tested were prepared essentially by the same general technique which is set forth in Example 1.

Determination Of Relative Molecular Weights

The molecular weight of ultra-high molecular weight polymers is very hard to determine precisely. In this invention, molecular weight was estimated by measuring the viscosity of a dilute solution of the polymer in toluene, and then calculating the molecular weight by means of the Mark-Houwink-Sakurada equation:

$$[\eta]^\circ = KMv^{\alpha}v$$

where $[\eta]^\circ$ is intrinsic viscosity, 100 ml./gr.; K and $\alpha$ are constants for the specific polymer, and Mv is the molecular weight.

Polystyrene constants, ie. K=0.0105 and $\alpha$=0.73 were used for obtaining the relative molecular weights of the polymers of the instant invention. Intrinsic viscosities of the polymers were determined by plotting the following relationships and projecting the results to zero concentration:

$$[\eta]_o = \lim_{c \to 0} \frac{\ln[\eta]rel}{c} \text{ and}$$

$$[\eta]_o = \lim_{c \to 0} \frac{\eta sp}{c}$$

where: c=concentration in grams/100 ml., and $[\eta]$ rel=relative viscosity equals the viscosity of the solution divided by the viscosity of toluene, and, $[\eta]$ sp=specific viscosity=$[\eta]$ rel−1.

The viscosity of the solution was determined by measuring the time required for a given quantity of the solution to flow through a Ubbelohde Viscometer.

Sample Calculation

The polymer was a polybutylacrylate as prepared by the procedure of Example 1. A solution was made of 0.0338 grams of polymer dissolved in 50 ml of toluene.

A portion of this was diluted 50/50 with more toluene, giving two solutions with the following concentrations:

$A = 0.0676$ grams/100 mL $B = 0.0338$ grams/100 mL

The two solutions and a sample of toluene were then passed through a Ubbelohde Viscometer with the following results:

|  | First Trial | Second Trial | Average |
|---|---|---|---|
| Toluene | — | — | 198.01 sec. |
| A | 349.07 sec. | 350.01 sec. | 349.54 sec. |
| B | 265.32 sec. | 264.30 sec. | 264.81 sec. |

Calculation for sample A:

$$[\eta]\text{rel} = \frac{349.54}{198.01} = 1.7653;$$

$\ln [\ ]\text{rel} = 0.5683$
$[\eta]\text{sp} = 1.7653 - 1 = 0.7653$ $$\frac{\ln[\eta]\text{rel}}{c} = \frac{0.5683}{0.0676} = 8.407$$

$$\frac{[\eta]\text{sp}}{c} = \frac{0.7653}{0.0676} = 11.321.$$

Similarly, for sample B, $$\frac{\ln[\eta]\text{rel}}{c} = 8.600$$

$$\frac{[\eta]\text{sp}}{c} = 9.982$$

These results are set forth in FIG. 1 to show the intrinsic viscosity. Therefore, $[\eta]^\circ$ for this sample is approximately 870.

Using the Mark-Houwink-Sakurada equation with the constant for styrene, the result is:

$$[\eta] = KM^\alpha v$$
$$870 = 0.0105 \times M^{0.73} v$$

$$Mv = \left(\frac{870}{0.0105}\right)^{\frac{1}{0.73}} = (82,860)^{1.37} = 5,450,000 \text{ gm/mol}$$

Preliminary Additive Evaluations

Figure 2:
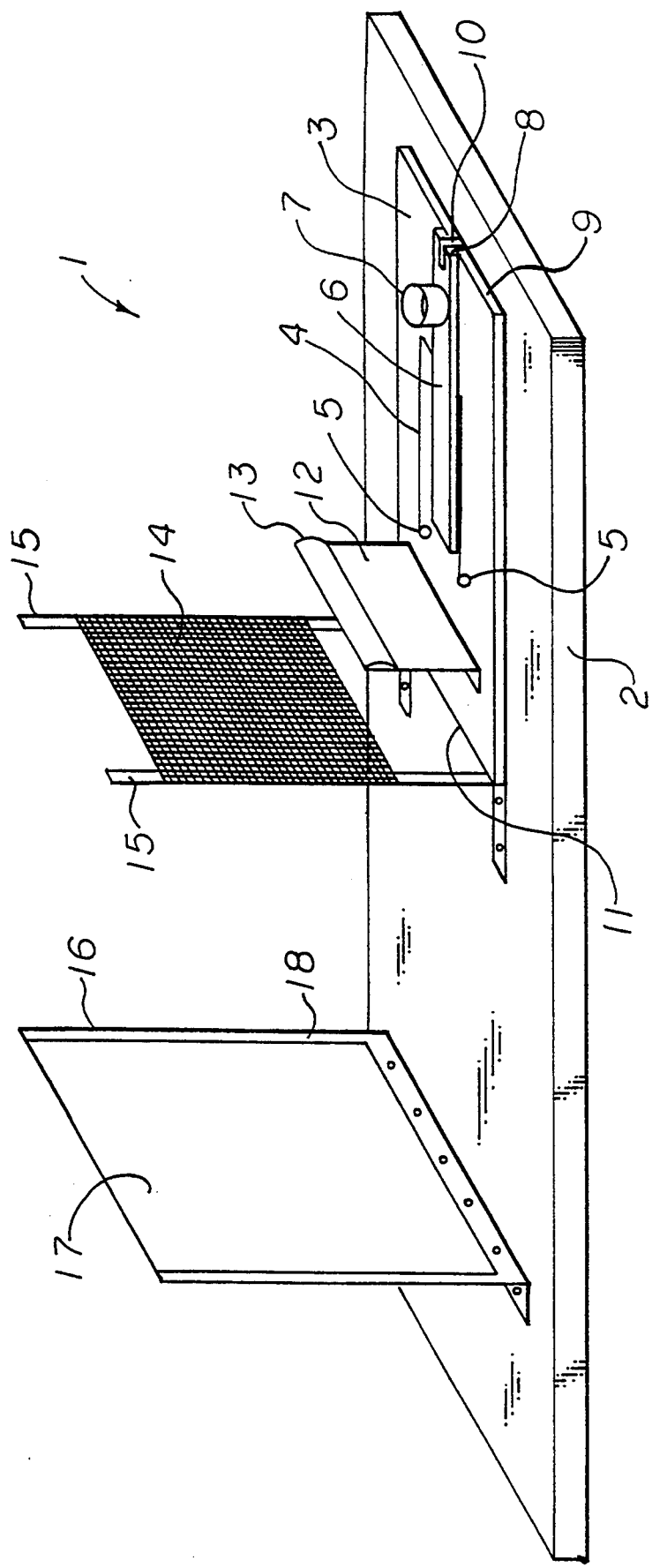
FIG. 2 is a drawing in perspective of the evaluation apparatus that was used as a screening means to determine the suitability of candidate additives as transfer efficiency promoters in this invention.
Figure 5:
FIG. 5 is a splattergram from the evaluation device of FIG. 2 showing the results from silver metallic paint containing 300 ppm of polybutylmethacrylate according to the instant invention.

As indicated above, the materials of this invention were evaluated for transfer efficiency by the use of an apparatus as shown in FIG. 2.

With regard to FIG. 2, there is shown a spray dispersion evaluation device 1 of this invention wherein there is shown a base 2, on which there is surmounted at one end (the front end herein for clarity sake), a support 3. The support 3 is firmly attached to the base 2 so that the support will not shift position while in use. Mounted on the support 3 is a wire spring 4, which rotates around two pins 5. The wire spring 4 is shown in the Fig. in its tension position. Mounted on the upper surface of the wire spring 4 is a small plate 6 which is surmounted at its front end by a small cup 7. The small plate 6 and the small cup 7 are securely fastened to the top of the spring so that in use, they will not come loose. It should be noted that the plate 6 extends beyond the length of the wire spring 4 such that its distal end 8 matches the leading edge 9 of the support 3, but does not extend beyond it. Located at the distal end 8 is a spring-loaded, releasable trip mechanism 10 to hold the wire spring 4 in the open, or tension position.

Vertically and solidly mounted a known distance from the distal end 11 of the support 3 is a single piece of rigid material 12 which operates as a stop. Attached to the upper front edge of the stop 12 is a soft piece of rubber, or sponge 13, which absorbs some of the shock of the wire spring 4 and the plate 6 when they come into contact with the stop 12, when the wire spring 4 is released by the trip mechanism 10. Solidly and vertically mounted on the base support 2, and some known distance from the distal end 11 of the support 3, is a screen 14, which is mounted on rigid or stiff metal supports 15 which allows for some portion of the screen 14 t be aligned above the rigid material 12.

At the distal end of the base support 2, and at a known distance from the screen 14, there is solidly, vertically mounted a support stand 16, which is used to hold a piece of paper 17 on its face 18. The support stand 16 is built to enable an operator to place and remove the paper 17 on the face 18 with little difficulty. In practice, the material to be tested is placed in the cup 7 (about five drops) and a clean, white piece of paper 7 is mounted on the support stand 16. With the wire spring 4 in its tension position, the wire spring 4 is released by the release mechanism 10, snapping the plate 6 carrying the cup 7 through an arc $\beta$, whereupon the forward progress of the plate 6 and the cup 7 are stopped by the stop 12, which causes the liquid material being evaluated to be thrown from the cup, through the screen 14, and against the paper 7, to form a pattern of the material on the paper 7. It is believed by the inventor herein that the ultra-high molecular weight materials of this invention when added to the coating formulation, beneficially effect the size distribution of the droplets of the coating so that they are less likely to be carried away by the air volumes during spraying. Thus, when the pattern on the paper shows a fine spray, then the material is not operating according to this invention. When the pattern on the paper shows a large agglomeration pattern on the paper, then the material is achieving the benefits of the instant invention. One needs to compare FIGS. 3, 4, 5, and 6 to get an idea of the purpose of the evaluation device wherein it can be observed that the pattern exhibits fewer fine particles when one of the materials of the instant invention is in use against a control. The test samples represented by FIGS. 4, 5, and 6 show that the use of polybutylmethacrylate at 150 ppm, 300 ppm, and 600 ppm, respectively, results in fewer fine particles with increasing concentration of additive. Since this test is qualitative and fairly subjective, the exact dimensions and positions of the components are fairly arbitrary. Some characteristics are essential though, if consistent interpretable results are to be obtained, these include:

A. The supports 15 for the screen must be sufficiently rigid so that there is essentially no movement of the screen when the liquid sample impacts the screen.

B. The stop 12, against which the wire spring 4 and the plate 6 impacts must be very rigid. The plate 6 must stop in a vertical position. It was found that repeated tests resulted in damage to the plate 6, until the rigid material was faced with a thin strip of hard rubber. This absorbed some of the energy with no apparent effect on test results.

C. The paper support stand 16 must be set far enough from the screen to allow the droplets to disperse as much as possible, but close enough to catch all the droplets.

EXAMPLE 1

To the polymerization apparatus described above, there was added 500 ml of deionized water. The nitrogen purge was started and was allowed to continue to flow throughout the experiment. To the water was added 4 grams of sodium lauryl sulfate,0,252 grams of sodium biphosphate, 0.202 grams of $K_2S_2O_8$, which were allowed to dissolve with stirring. Then 252 grams of NaOH-prewashed, butyl methacrylate (Aldrich 23, 586-5, lot 06616BW, Aldrich Chemical Co.) were quickly added which caused foam, which was controlled by slowing the flow of bubbled nitrogen. A flow of nitrogen was continued in this manner for about 5 hours, and then the nitrogen was switched over to a nitrogen sweep. Samples of the polymerizing material were removed periodically in order to determine gravimetrically the degree of polymerization that had occurred. The polymerization was run for about 22 hours and again checked for complete polymerization. At 48 hours, the reaction appeared to be complete as indicated by the disappearance of the odor of the butyl monomer.

EXAMPLE 2

In order to be effective as an additive in a coating formulation, the additive must be soluble in the coating vehicle, and compatible with the binder. Therefore, the first test is to add a few drops of the 1.5% polymer in toluene solution to about 10 ml of the clear vehicle. If the polymer was not soluble, a hazy to white precipitate formed immediately and no further evaluation was done. If the polymer appeared to be soluble, 0.1, 0.2, and 0.4 grams of the 1.5% polymer additive solutions were added to ten gram samples of a silver metallic pigmented paint. These dilutions correspond to 150 ppm, 300 ppm and 600 ppm of additive in the paint. Mixing was then accomplished by hand, followed by 2 to 3 days on a wrist shaker, followed by more hand shaking. Ten materials were prepared and evaluated by the methods and tests set forth above. The results can be found on Table 1.

TABLE 1

| SAMPLE | *Intrinsic Visc. | Molecular weight (g/mole) | Soluble in vehicle | Enhanced Particle Size |
|---|---|---|---|---|
| A | 1060 | $7.2 \times 10^6$ | NO | NO |
| B | 700 | $4.1 \times 10^6$ | YES | NO** |
| C | 1481 | $11.3 \times 10^6$ | YES | YES |
| D | 1340 | $9.8 \times 10^6$ | YES | YES |
| E | 1120 | $7.7 \times 10^6$ | YES | YES |

TABLE 1-continued

| SAMPLE | *Intrinsic Visc. | Molecular weight (g/mole) | Soluble in vehicle | Enhanced Particle Size |
|---|---|---|---|---|
| F | 900 | $5.45 \times 10^6$ | YES | YES |

*In toluene in ml/gm at 25° C.
**marginal
A = Poly (2-ethylhexylmethacrylate)***
B = Poly(methylmethacrylate)
C = Poly(butylmethacrylate)
D = Poly(butylmethacrylate)
E = Poly(ethylmethacrylate)
F = Poly(butylacrylate)
***not within the scope of this invention Only those materials which were soluble in the clear vehicle and which showed enhanced particle size distribution in this test were considered suitable candidates for advanced evaluations. While the samples that failed the solubility test may be suitable transfer efficiency promoters in a different vehicle formulation, this test demonstrates that the materials have to be soluble in the vehicle in order to be effective and fall within the scope of the instant claims.

Because of their good performance in the preliminary screening tests, the materials C, D, and E, were evaluated for transfer efficiency in commercial spraying equipment using a Binks 610 air spray gun at 50 PSIG, 63C fluid nozzle, 63PB air cap at 12 inches from gun to the target. The paints available from PPG Industries, Inc. as UBCN 33600 (resinous binder was acrylic/-polyester-melamine mixture) were reduced to 18 sec. viscosity (#4 Ford) with xylene before spraying. The results are in TABLE 2.

TABLE 2

TRANSFER EFFICIENCIES* WITH DIFFERENT ADDITIVES

| ADDITIVE | CONTROL 0 PPM | @100 ppm | RELATIVE IMPROVEMENT % | @300 ppm | RELATIVE IMPROVEMENT % |
|---|---|---|---|---|---|
| C | 33.2% | 36.4% | 9.6 | 42.1% | 26.8 |
| D | 25.6% | | | 35.6% | 38.5 |
| E | 25.6% | | | 33.4% | 30.0 |

*Transfer efficiencies were determined according to ASTM D-5009

Even at the low concentration of 100 ppm, additive C improved the transfer efficiency by almost 10 relative percent, an improvement that essentially meets the industry needs. At 300 ppm, the improvements in transfer efficiency far exceeded this benchmark. It is therefore concluded that additives (in the instant case ultra-high molecular weight polymers) can be prepared which cause a commercially significant improvement in the transfer efficiency of spray coating operations for solvent-based paints.

EXAMPLE 3

Several binder materials were evaluated in this invention by formulating the materials according to the procedure of Example 2, above. Each of the materials were then tested in a spray apparatus as described above. The results can be found on TABLE 3.

TABLE 3

| BINDER TYPE | SUPPLIER AND PAINT TYPE | ADDITIVE LEVEL* |
|---|---|---|
| Solvent-based Epoxy | Tri Clad Enamel Desert Sand MC-43 Parts A & B Sherwin-Williams Co. Cleveland, Ohio | <100 ppm |
| Solvent-based | 917-8125 | 50 ppm |

TABLE 3-continued

| BINDER TYPE | SUPPLIER AND PAINT TYPE | ADDITIVE LEVEL* |
|---|---|---|
| acrylic/urethane | 97-81 PPG Industries, Inc. Ditzler Automotive Finishes Division Troy, Michigan | |
| Solvent-based acrylic/urethane | 917-8125 97-81 PPG Industries, Inc. Ditzler Automotive Finishes Division Troy, Michigan | 100 ppm |
| Solvent-based alkyd resin | M5J81 Blue HS alkyd Striker Paint Products, Inc. Novi, Michigan | 70 ppm |
| Solvent-based alkyd primer/sealer | DPE 1338 PPG Industries, Inc. | <100 ppm |
| Solvent-based Urethane | B-21-1334 Black Urethane | 210 ppm |
| Solvent-based acrylic enamel | Delstar DAR 9000 PPG Industries, Inc. | 40 ppm |
| Solvent-based Heat Resistant | Thermalox Dampney Company, Inc. | <100 ppm |
| Silicone | Everett, Mass. | |

*Poly(butylmethacrylate)

All of the binders were compatible with the additive, and reduced over spray and reduced fogging when compared to a spray in which none of the additives were used.

I claim:

1. A method of improving the transfer efficiency of sprayed organic polymer-based paint, the method comprising spraying onto a surface a paint, said paint comprising a composition of matter containing an organic polymer-based vehicle useful for paint, having solubilized therein an ultra-high molecular weight acrylic polymer.

2. A method of improving transfer efficiency of an organic polymer-based paint during spraying of the paint onto a surface, the method comprising blending with the paint prior to spraying, an ultra-high molecular weight polymer which is compatible with the vehicle of the paint.

3. A method as claimed in claim 2 wherein the ultra-high molecular weight polymer has a molecular weight in the range of four million to fifteen million.

4. A method as claimed in claim 2 wherein the ultra-high molecular weight polymer has a molecular weight in the range of eight million to thirteen million.

* * * * *